(12) United States Patent
Muramatsu

(10) Patent No.: US 8,154,605 B2
(45) Date of Patent: Apr. 10, 2012

(54) IMAGE TRACKING APPARATUS, IMAGE TRACKING METHOD AND CAMERA FOR IMPROVED RECOGNITION OF A TARGET OBJECT

(75) Inventor: Keiko Muramatsu, Tachikawashi (JP)

(73) Assignee: Nikon Corporation, Tokyo (JP)

( * ) Notice: Subject to any disclaimer, the term of this patent is extended or adjusted under 35 U.S.C. 154(b) by 417 days.

(21) Appl. No.: 12/308,668

(22) PCT Filed: Aug. 8, 2007

(86) PCT No.: PCT/JP2007/065538
§ 371 (c)(1),
(2), (4) Date: Dec. 19, 2008

(87) PCT Pub. No.: WO2008/026434
PCT Pub. Date: Mar. 6, 2008

(65) Prior Publication Data
US 2010/0066843 A1    Mar. 18, 2010

(30) Foreign Application Priority Data
Aug. 30, 2006 (JP) ................... 2006-233823

(51) Int. Cl.
*H04N 5/228* (2006.01)

(52) U.S. Cl. .............. 348/208.14; 348/208.99; 348/169; 348/700; 382/103

(58) Field of Classification Search .......... 348/169–172, 348/207.99–376, 699–702; 382/103
See application file for complete search history.

(56) References Cited

U.S. PATENT DOCUMENTS

| | | | | |
|---|---|---|---|---|
| 5,512,974 A * | 4/1996 | Abe et al. | ....................... | 396/153 |
| 5,614,985 A * | 3/1997 | Odaka | .............................. | 396/51 |
| 6,072,526 A | 6/2000 | Hashimoto et al. | | |
| 6,172,706 B1 * | 1/2001 | Tatsumi | ......................... | 348/169 |
| 6,249,317 B1 | 6/2001 | Hashimoto et al. | | |
| 6,404,986 B1 * | 6/2002 | Morikawa | ........................ | 396/50 |
| 7,565,072 B2 * | 7/2009 | Ito | .................................. | 396/121 |
| 2002/0027607 A1 * | 3/2002 | Omura | .......................... | 348/370 |
| 2003/0179310 A1 * | 9/2003 | Irie | ................................. | 348/349 |

(Continued)

FOREIGN PATENT DOCUMENTS

JP    A-5-37940    2/1993

(Continued)

OTHER PUBLICATIONS

European Search Report for corresponding European Patent Application No. 07792205.2, mailed on Nov. 25, 2010.

(Continued)

*Primary Examiner* — Tuan Ho
*Assistant Examiner* — Kent Wang
(74) *Attorney, Agent, or Firm* — Oliff & Berridge, PLC

(57) ABSTRACT

An image tracking apparatus includes: an imaging device that generates image information by capturing an image formed through an image forming optical system; a setting unit that sets, based upon the image information, first reference image information that includes image information corresponding to a part of an image to be designated as a target in the image information and also sets second reference image information based upon information related to an image assuming a position close to an image corresponding to the first reference image information; and a recognition unit that recognizes the target based upon the first reference image information and the second reference image information.

24 Claims, 7 Drawing Sheets

U.S. PATENT DOCUMENTS

Figure 1:
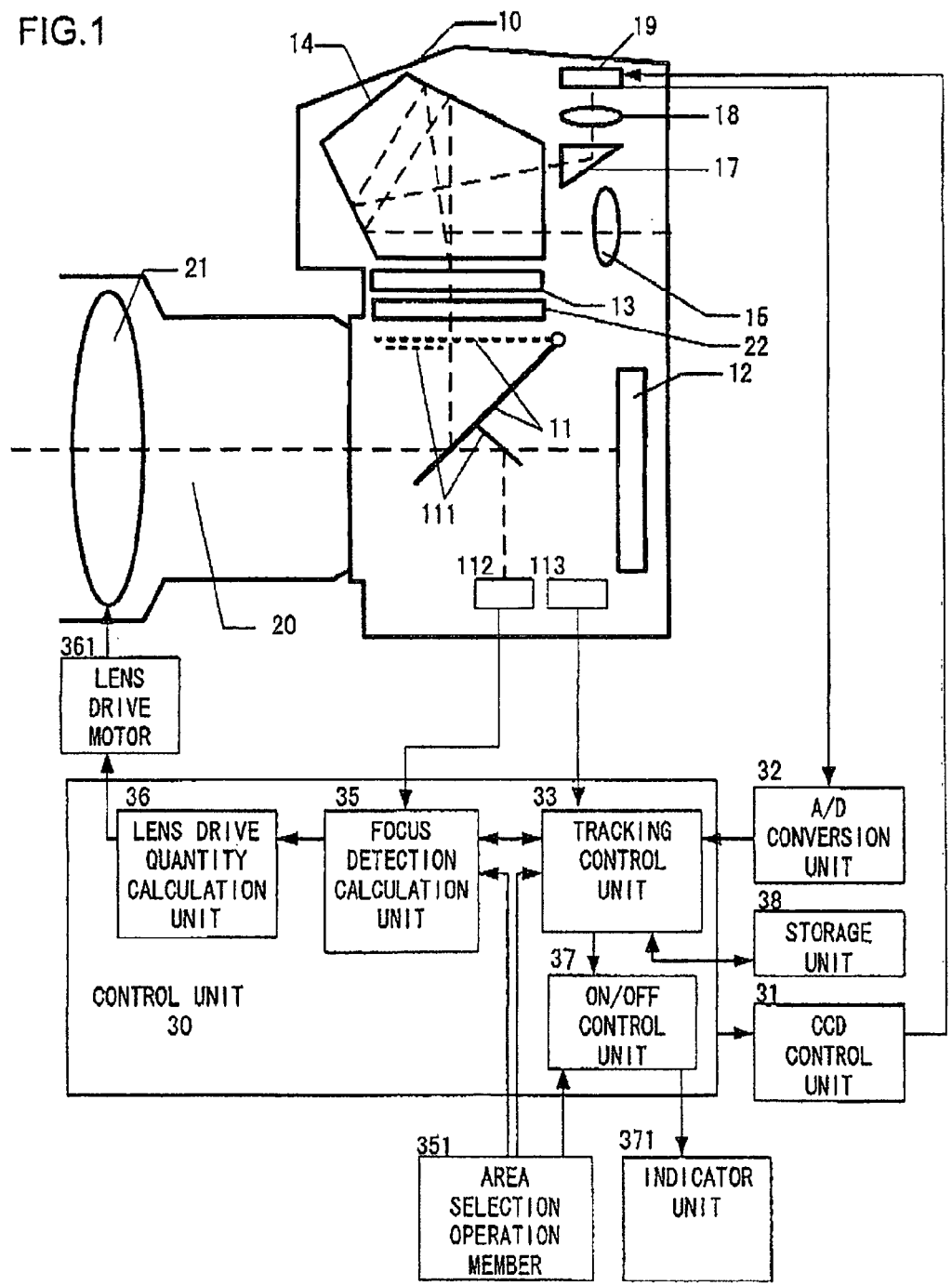

| | | |
|---|---|---|
| 2005/0031325 A1 | 2/2005 | Fujii |
| 2005/0104997 A1* | 5/2005 | Nonaka ......................... 348/360 |
| 2005/0206748 A1* | 9/2005 | Kato ......................... 348/231.99 |
| 2005/0264679 A1 | 12/2005 | Sasaki et al. |

FOREIGN PATENT DOCUMENTS

| | | |
|---|---|---|
| JP | A-2000-188713 | 7/2000 |
| JP | A-2001-243478 | 9/2001 |
| JP | A-2003-241065 | 8/2003 |
| JP | A-2003-315664 | 11/2003 |
| JP | A-2005-55744 | 3/2005 |
| JP | A-2006-58431 | 3/2006 |

OTHER PUBLICATIONS

Oct. 18, 2011 Office Action in Japanese Patent Application No. 2008-532011 (with English translation).

* cited by examiner

FIG.2 (a)
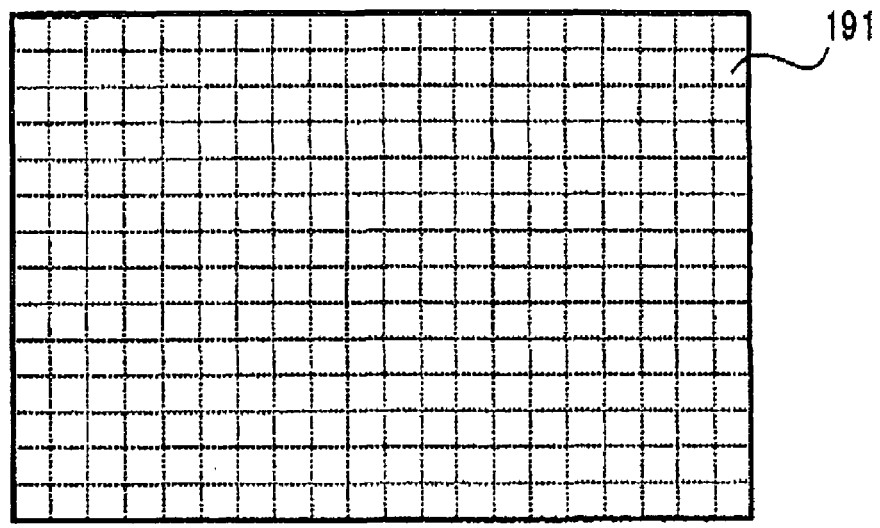
(b)
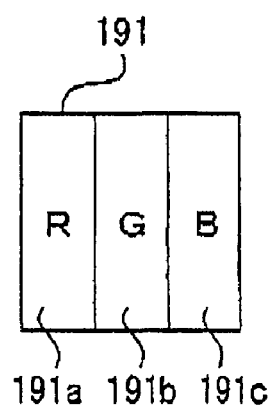

FIG.3
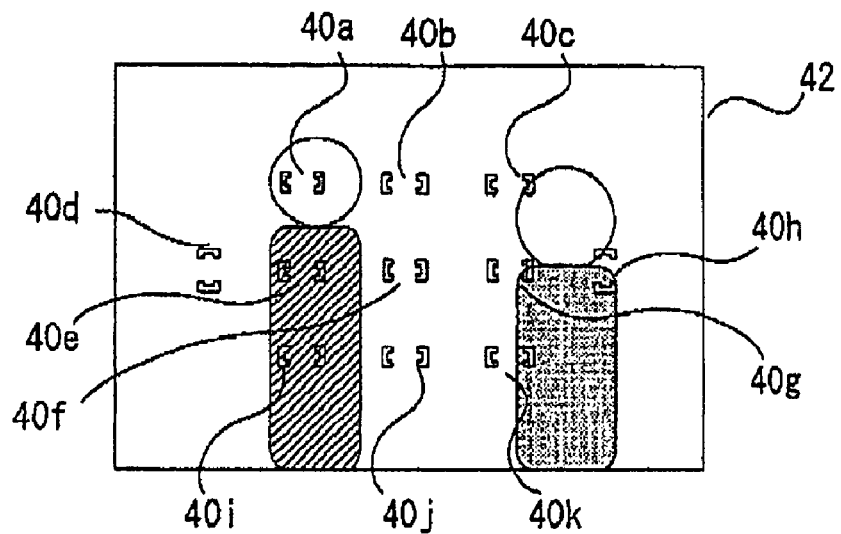
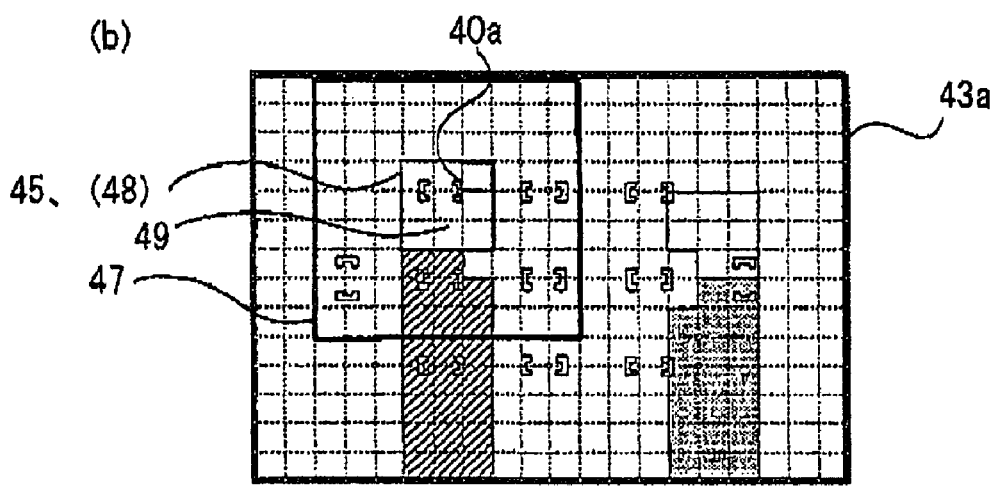
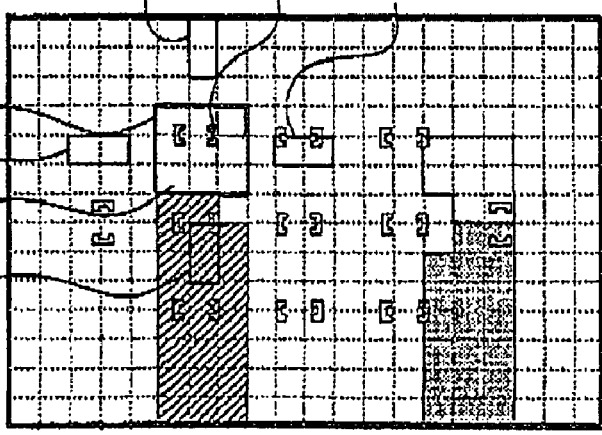

FIG.7

SETTING UNIT 201

(1) DETERMINE THE TRACKING TARGET SUBJECT AREA 45 BY USING BRIGHTNESS INFORMATION (3) SET IMAGE INFORMATION MANIFESTING LEAST EXTENT OF CHANGE AND HELD IN A SPECIFIC PERIPHERAL INFORMATION AREA 41 AMONG PERIPHERAL INFORMATION AREAS 41 DETECTED THROUGH REPEATED DETECTIONS AS SUBJECT PERIPHERAL INFORMATION 46

(4) SET AN INTEGRATED TEMPLATE BY COMBINING THE TEMPLATE IMAGE 48 AND THE SUBJECT PERIPHERAL INFORMATION 46

(6) USE INFORMATION IN A PERIPHERAL INFORMATION AREA 41 WITH A DEFOCUS QUANTITY DIFFERING FROM THE DEFOCUS QUANTITY IN THE TRACKING TARGET SUBJECT AREA 45 BY AN EXTENT EQUAL TO OR LESS THAN A PREDETERMINED VALUE AS THE SUBJECT PERIPHERAL INFORMATION 46 ·
  DETERMINE A SPECIFIC POSITIONAL RELATIONSHIP TO BE ASSURED FOR THE TEMPLATE IMAGE 48 AND THE SUBJECT PERIPHERAL INFORMATION 46 BASED UPON THE DEFOCUS QUANTITY (7) SET THE TRACKING TARGET SUBJECT BASED UPON AUTOMATIC SUBJECT RECOGNITION RESULTS (8) CONTINUOUSLY USE THE INITIAL TEMPLATE IMAGE 48

(9) DETERMINE THE SIZE OF THE SUBJECT PERIPHERAL INFORMATION 46 BASED UPON THE SIZE OF THE TRACKING TARGET SUBJECT AREA 45

(10) DETERMINE THE SIZE OF THE SUBJECT PERIPHERAL INFORMATION 46 BASED UPON THE OPTICAL CHARACTERISTICS OF THE IMAGE FORMING OPTICAL SYSTEM

(11) ADJUST THE POSITIONS OF THE SUBJECT PERIPHERAL INFORMATION 46 BASED UPON THE SIZE OF THE TRACKING TARGET SUBJECT AREA 45

(12) INCREASE THE TRACKING TARGET SUBJECT AREA 45, INCREASE THE SIZE OF THE SUBJECT PERIPHERAL INFORMATION 46 AND INCREASE THE DISTANCE FROM THE TRACKING TARGET SUBJECT AREA 45 AS THE SUBJECT MOVES CLOSER (AS THE IMAGE MAGNIFICATION FACTOR INCREASES)

RECOGNITION UNIT 202

(2) USE A PERIPHERAL INFORMATION AREA HOLDING CHROMATIC IMAGE INFORMATION OR CHARACTERISTIC IMAGE INFORMATION
  · USE THE PERIPHERAL INFORMATION AREA 41 LOCATED ON THE LOWER SIDE OF THE TRACKING TARGET SUBJECT CANDIDATE AREA 50
  · SET A GREATER WEIGHTING COEFFICIENT FOR THE PERIPHERAL INFORMATION AREA 41 LOCATED ON THE LOWER SIDE OF THE TRACKING TARGET SUBJECT CANDIDATE AREA 50
  · SELECT A PERIPHERAL INFORMATION AREA 41 BASED UPON THE OUTPUT FROM THE ATTITUDE SENSOR 113

(5) USE COLOR INFORMATION HAVING UNDERGONE IMAGE PROCESSING

(13) APPLY A GREATER WEIGHTING COEFFICIENT TO THE SUBJECT PERIPHERAL INFORMATION 46 COLLECTED AT A POSITION BELOW THE TRACKING TARGET SUBJECT AREA 45 AMONG THE PLURALITY OF SETS OF SUBJECT PERIPHERAL INFORMATION 46

IMAGE TRACKING APPARATUS, IMAGE TRACKING METHOD AND CAMERA FOR IMPROVED RECOGNITION OF A TARGET OBJECT

TECHNICAL FIELD

The present invention relates to an image tracking apparatus capable of automatically tracking a photographic subject that moves within the image plane, an image tracking method adopted in the image tracking apparatus and a camera equipped with the image tracking apparatus.

BACKGROUND ART

There is a camera known in the related art that automatically tracks a moving subject while photographing the subject and executes focus detection or exposure calculation accordingly. The camera in the related art tracks a target object determined to indicate a high level of correlation through pattern matching based upon an image stored therein to be used as a reference for subject tracking (see, for instance, patent reference literature 1).
Patent document 1: Japanese Laid Open Patent Publication No. 2006-58431

DISCLOSURE OF THE INVENTION

Problems to be Solved by the Invention

There is an issue yet to be addressed effectively in that the wrong object tends to be detected as the tracking target in case that an image similar to the reference image is contained in the background or crosses in front of the tracking target.

Means for Solving the Problems

According to the 1st aspect of the present invention, an image tracking apparatus comprises: an imaging device that generates image information by capturing an image formed through an image forming optical system; a setting unit that sets, based upon the image information, first reference image information that includes image information corresponding to a part of an image to be designated as a target in the image information and also sets second reference image information based upon information related to an image assuming a position close to an image corresponding to the first reference image information; and a recognition unit that recognizes the target based upon the first reference image information and the second reference image information.
According to the 2nd aspect of the present invention, in the image tracking apparatus according to the 1st aspect, it is preferred that the setting unit sets the second reference image information so that the image corresponding to the second reference image information ranges over a smaller area than the image corresponding to the first reference image information.
According to the 3rd aspect of the present invention, in the image tracking apparatus according to the 1st or the 2nd aspect, it is preferred that: the image tracking apparatus further comprises a focus detection device that detects a focusing condition of the image forming optical system in relation to the target; and the setting unit determines the second reference image information based upon the focusing condition.
According to the 4th aspect of the present invention, in the image tracking apparatus according to the 1st or the 2nd aspect, it is preferred that the setting unit repeatedly detects information related to an image assuming a position close to the image corresponding to the first reference image information and designates image information indicating a least extent of change as the second reference image information.
According to the 5th aspect of the present invention, in the image tracking apparatus according to any one of the 1st through 4th aspects, it is preferred that if a plurality of sets of image information indicating levels of correlation to the first reference image information equal to or greater than a predetermined value are detected as candidates that may be recognized as the target, the recognition unit selects one of the plurality of candidates based upon the second reference image information.
According to the 6th aspect of the present invention, in the image tracking apparatus according to any one of the 1st through 5th aspects, it is preferred that the setting unit determines at least either a size or a position of the image corresponding to the second reference image information based upon a size of the image corresponding to the first reference image information.
According to the 7th aspect of the present invention, in the image tracking apparatus according to any one of the 1st through 6th aspects, it is preferred that the setting unit determines a size of the image corresponding to the second reference image information based upon optical characteristics of the image forming optical system.
According to the 8th aspect of the present invention, in the image tracking apparatus according to any one of the 5th through 7th aspects, it is preferred that the recognition unit selects one of the candidates by weighting the second reference image information set on a lower side of the image corresponding to the first reference image information in the image information to a greater extent than the second reference image information set elsewhere.
According to the 9th aspect of the present invention, in the image tracking apparatus according to any one of the 1st through 8th aspects, it is preferred that the image information is color information or luminance information.
According to the 10th aspect of the present invention, a camera comprises an image tracking apparatus according to any one of the 1st through 9th aspects.
According to the 11th aspect of the present invention, in the camera according to the 10th aspect, it is preferred that: the camera further comprises an attitude detection device that detects an attitude of the camera; and the recognition unit includes a determination unit that determines the second reference image information based upon an output from the attitude detection device.
According to the 12th aspect of the present invention, in the camera according to the 10th or the 11th aspect, it is preferred that the image information has undergone image processing.
According to the 13th aspect of the present invention, an image tracking method comprises: generating image information by capturing an image formed through an image forming optical system; setting, based upon the image information, first reference image information which includes image information corresponding to a part of an image to be designated as a target in the image information and setting second reference image information based upon a position of an image close to the image corresponding to the first reference image information; and recognizing the target based upon the first reference image information and the second reference image information.
According to the 14th aspect of the present invention, in the image tracking method according to the 13th aspect, it is preferred that the second reference image information is determined based upon a focusing condition of the image forming optical system in relation to the target.

According to the 15th aspect of the present invention, in the image tracking method according to the 14th aspect, it is preferred that information related to an image assuming a position close to the image corresponding to the first reference image information is repeatedly detected and image information indicating a least extent of change is designated as the second reference image information.

According to the 16th aspect of the present invention, in the image tracking method according to any one of the 13th through 15th aspects, it is preferred that when a plurality of sets of image information indicating levels of correlation to the first reference image information equal to or greater than a predetermined value are detected as candidates that may be recognized as the target, one of the plurality of candidates is selected based upon the second reference image information.

According to the 17th aspect of the present invention, in the image tracking method according to any one of the 13th through 16th aspects, it is preferred that at least either a size or a position of the image corresponding to the second reference image information is determined based upon a size of the image corresponding to the first reference image information.

According to the 18th aspect of the present invention, in the image tracking method according to any one of the 13th through 17th aspects, it is preferred that a size of the image corresponding to the second reference image is determined based upon optical characteristics of the image forming optical system.

According to the 19th aspect of the present invention, in the image tracking method according to any one of the 16th through 18th aspects, it is preferred that one of the candidates is selected by weighting the second reference image information set on a lower side of the image corresponding to the first reference image information in the image information to a greater extent than the second reference image information set elsewhere.

Advantageous Effect of the Invention

According to the present invention, the target object is recognized based upon first reference image information that includes image information related to an image portion constituting part of a target image and second reference image information set based upon image information related to an image portion assuming a position near the image portion corresponding to the first reference image information, achieving improved recognition accuracy.

BRIEF DESCRIPTION OF THE DRAWINGS (FIG. 1) An illustration of the essential structure of the digital camera achieved in an embodiment of the present invention (FIG. 2) An illustration of the structure of pixels constituting the image sensor (FIG. 3) An illustration for the tracking method achieved in the embodiment (FIG. 4) An illustration for the tracking method achieved in the embodiment (FIG. 5) An illustration for the tracking method achieved in the embodiment (FIG. 6) A flowchart of the subject tracking processing executed in the embodiment (FIG. 7) A functional block diagram summarizing the variations

BEST MODE FOR CARRYING OUT THE INVENTION

The following is a description of a single lens reflex digital camera equipped with a subject tracking apparatus, achieved in an embodiment of the present invention. FIG. 1 shows the essential structure of the digital camera according to the present invention. A lens barrel 20 that includes a photographic lens 21 is interchangeably mounted at a camera body 10.

Inside the camera body 10, a first image sensor 12 used to capture an image of a photographic subject is installed. The first image sensor 12 may be constituted with a CCD or a CMOS. A quick return mirror 11 that reflects subject light having passed through the photographic lens 21 toward a viewfinder optical system is disposed between the photographic lens 21 and the first image sensor 12. Part of the subject light is transmitted through a semi-transparent area of the quick return mirror 11, is reflected downward at a sub mirror 111 and enters a phase difference AF sensor module 112. An attitude sensor 113 detects the attitude of the camera.

The phase difference AF sensor module 112 includes a focus detection optical system that forms a pair of focus detection light images by splitting a focus detection light flux and a pair of CCD line sensors that output focus detection signals corresponding to the pair of split light images input thereto. The focus detection signals output from the CCD line sensors are input to a control unit 30 that outputs a lens drive signal based upon which a focus adjusting lens is driven to a focusing position as detailed later.

The subject light reflected at the quick return mirror 11 forms an image on a reticle 13 disposed at a position optically equivalent to the position of the first image sensor 12. The subject image formed on the reticle 13 is observed by the photographer via a pentaprism 14 and an eyepiece lens 15, and is also transmitted from the pentaprism 14 through a prism 17 and an image forming lens 18 to form an image on the light receiving surface of a second image sensor 19. It is to be noted that as a shutter release button (not shown) is pressed all the way down in order to execute a photographing operation, the quick return mirror 11 swings into the position indicated by the dotted line in the figure and an image is formed with subject light on the first image sensor 12.

The second image sensor 19 includes a plurality (20×14 in the example shown in the figure) pixels 191 arrayed in a matrix pattern, as shown in FIG. 2(a) The pixels 191 are each split into three sub-pixels 191a~191c, as shown in FIG. 2(b). Three primary color filters corresponding to R (red), G (green) and B (blue) are disposed at the sub-pixels 191a~191c and thus, RGB data constituting the subject image are output.

The second image sensor 19 stores signal charges corresponding to the subject image formed on the image capturing surface thereof and discharge the stored charges under control executed by a CCD control unit 31. An A/D conversion circuit 32 converts analog image signals output from the second image sensor 19 to digital image signals and outputs the digital image signals resulting from the conversion to the control unit 30. The control unit 30 is constituted with a CPU, a ROM, a RAM and various peripheral circuits. It includes as its functional units a tracking control unit 33 that tracks a tracking target based upon image data (raw data) input from the second image sensor 19, which have not undergone image processing, a focus detection calculation unit 35 that executes focus detection calculation, a lens drive quantity calculation unit 36 that determines through arithmetic operation a drive quantity indicating the extent to which the photographic lens 21 is to be driven and an ON/OFF control unit 37 for an indicator (display) unit 371, which turns ON/OFF an AF area mark indicating a focus detection area 40 to be detailed later. The indicator unit 371 displays the AF area mark on a liquid crystal display panel 22 disposed near the reticle 13.

The focus detection calculation unit 35 determines through arithmetic operation a focusing condition such as a defocus quantity based upon the focus detection signals output from the pair of CCD line sensors corresponding to a specific focus detection area 40 selected by the photographer by operating an area selection operation member 351.

As shown in FIG. 3(*a*), eleven focus detection areas 40*a*~40*k*, for instance, may be set within an image plane 42 viewed through the viewfinder in the camera achieved in the embodiment. As one of the eleven focus detection areas 40*a*~40*k* is selected via the area selection operation member 351, the focus detection calculation unit 35 executes arithmetic operation to determine the focusing condition (hereafter referred to as the defocus quantity for purposes of convenience) in correspondence to the selected focus detection area. The area selection operation member 351 outputs a selected area signal, indicating the specific focus detection area having been selected among the eleven focus detection areas 40*a*~40*k*, to the tracking control unit 33. The defocus quantity calculated by the focus detection calculation unit 35 is output to the lens drive quantity calculation unit 36. Based upon the defocus quantity input thereto, the lens drive quantity calculation unit 36 calculates the lens drive quantity and outputs a lens drive signal indicating the lens drive quantity to a lens drive motor 361. In response to the lens drive signal, the lens drive motor 361 displaces the photographic lens 21 along the optical axis and the focusing condition is thus adjusted. It is to be noted that the focus detection area may be automatically selected in the camera based upon detected focusing conditions instead of via the area selection operation member 351. In either case, the selected area signal indicating the selected area is output to the tracking control unit 33

Based upon the selected area signal input thereto, the tracking control unit 33 extracts image data corresponding to a tracking area from the image data input from the second image sensor 19 and executes subject tracking operation based upon the image data in the tracking area. The tracking operation in the embodiment is executed by setting a tracking target subject area 45, peripheral information areas 41*a*~41*d* (reference numeral 41 may be used to refer to them collectively) and a subject search area 47 larger than the tracking target subject area 45 on an initial image 43*a* obtained from the second image sensor 19 and designating the image contained in the tracking target subject area 45 as a template image 48, as shown in FIGS. 3(*b*) and 3(*c*).

The tracking target subject area 45 is a rectangular area enclosing a same-color information area 49 containing color information similar to the color indicated by pixel information (subject color information) corresponding to the focus detection area (40*a* in the example presented in FIG. 3) recognized based upon the selected area signal. The peripheral information areas 41 are set at positions set apart from the tracking target subject area 45 by, for instance, one pixel on the upper side, the lower side, the left side and the right side relative to the tracking target subject area 45 and are smaller than the tracking target subject area 45, e.g., the peripheral information areas may be two-pixel areas, as shown in FIG. 3(*c*). Color information related to the individual colors, i.e., R, G and B, in the image data obtained via the corresponding pixels in the peripheral information areas is stored as subject peripheral information 46 (46*a*~46*d*). The subject search area 47, centered on the tracking target subject area 45 is set by expanding the tracking target subject area 45 by, for instance, a three pixel range upward, downward, to the left and to the right. The subject is tracked through images repeatedly obtained in time sequence via the second image sensor 19 by setting a comparison target area assuming a size equal to that of the template image 48 within the subject search area 47, calculating the difference between the image information in the comparison target area and the image information in the template image 48 and comparing information obtained in peripheral information areas set around a comparison target area indicating a difference equal to or less than a predetermined value, i.e., a new tracking target subject area candidate, with the subject peripheral information 46.

Figure 4:
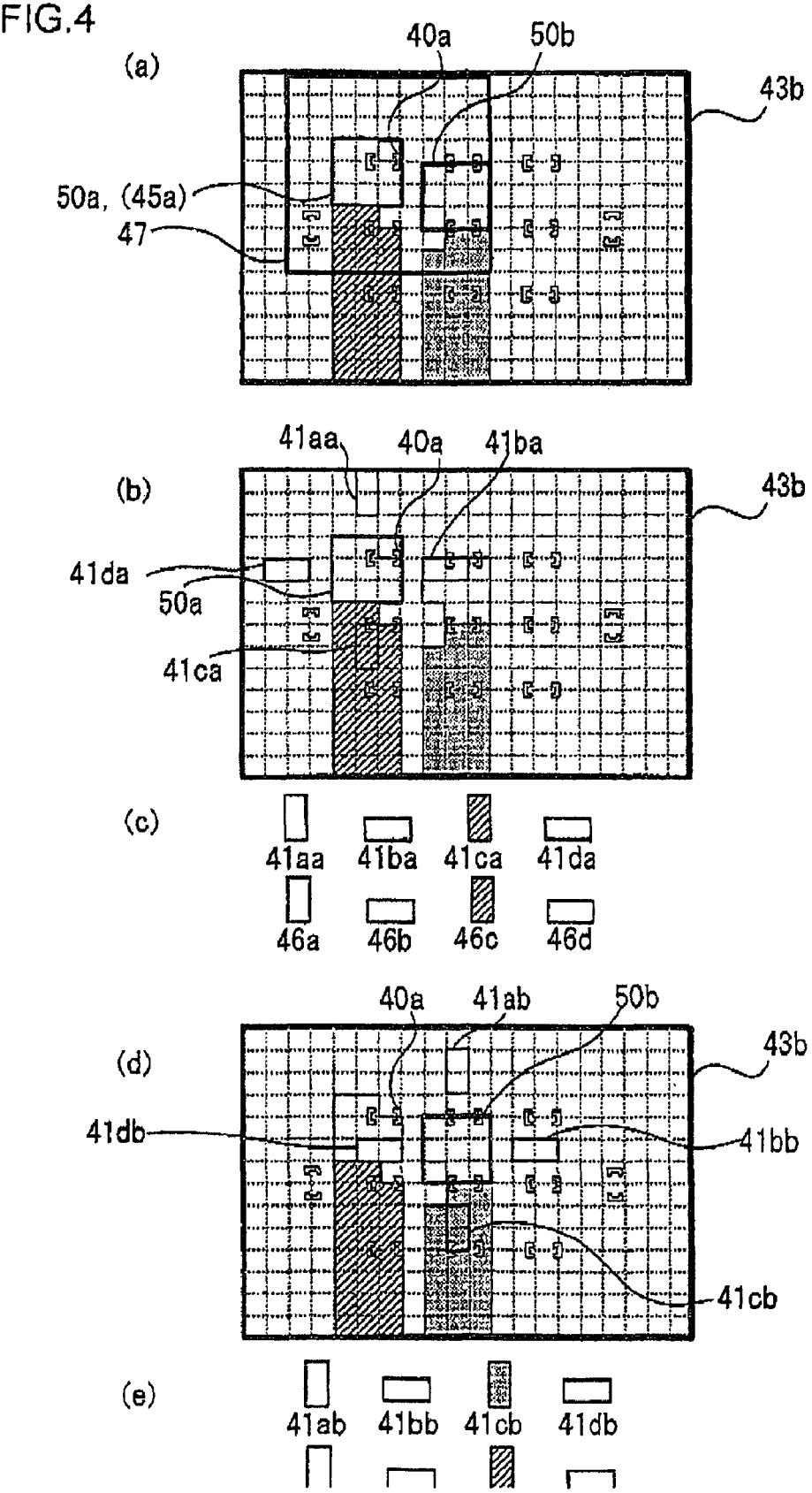
Figure 5:
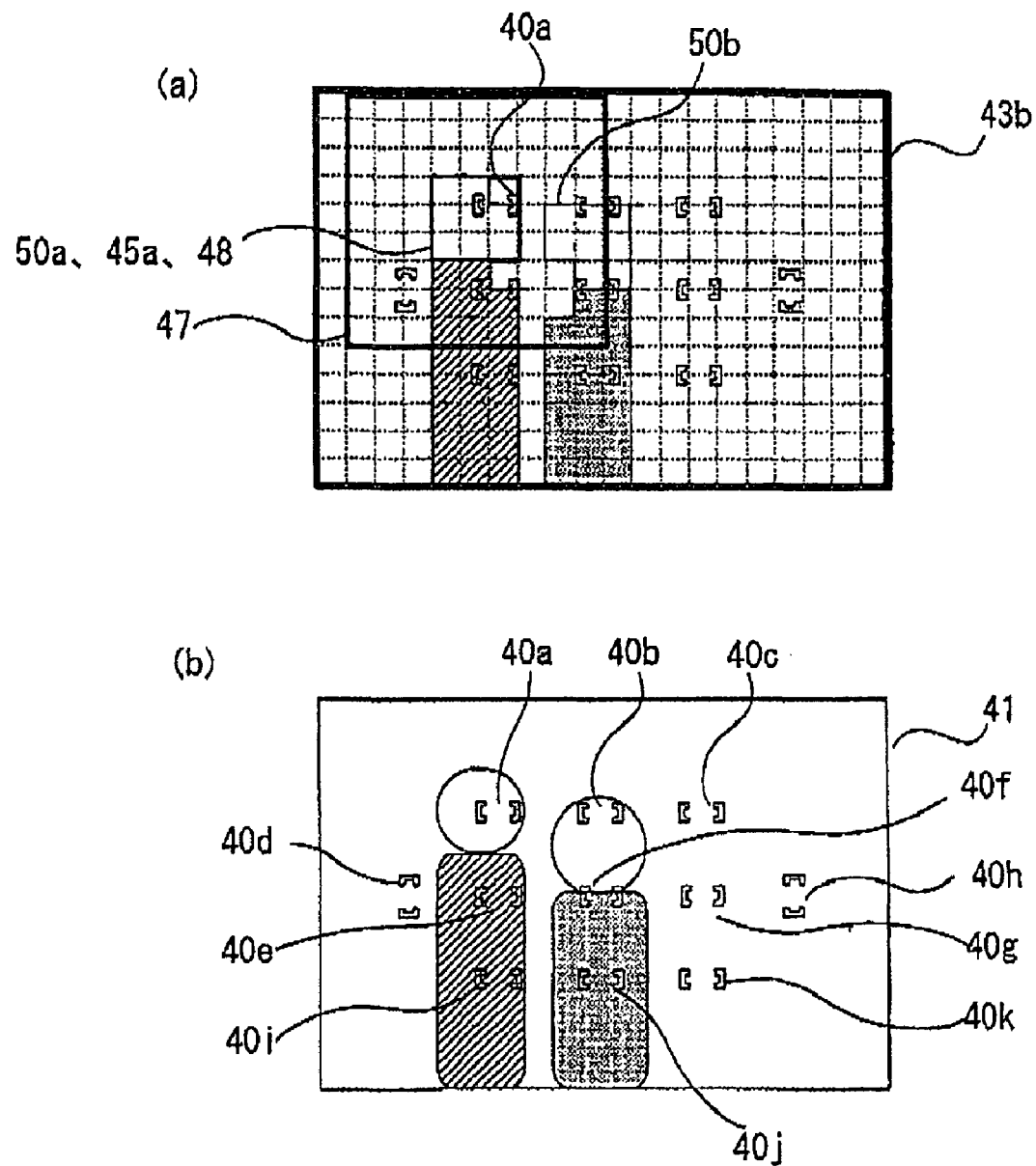

In reference to FIGS. 3 and 4, the subject tracking method is described in detail. It is assumed that the focus detection area 40*a* has been selected, as shown in FIG. 3(*a*), by the photographer via the area selection operation member 351. Based upon the selected area signal provided from the area selection operation member 351, the tracking control unit 33 stores into a storage unit 38, subject color information constituted with color information corresponding to the R, G and B colors, obtained from pixels present within a predetermined range corresponding to the position of the focus detection area 40*a*. The tracking control unit 33 detects a cluster of pixels in the initial image 43*a* in FIG. 3(*b*) indicating differences relative to the R, G and E colors in the subject color information that are equal to or less than a predetermined value, as the same-color information area 49 containing color information similar to the subject color information (containing color information with a high level of correlation) and sets a rectangular area enclosing the area 49 as the tracking target subject area 45. This tracking target subject area 45 is stored into the storage unit 38 as the template image 48. In addition, the tracking control unit sets another area, i.e., the subject search area 47 centered on the tracking target subject area 45 by expanding the tracking target subject area by, for instance, three pixels upward, downward, to the left and to the right. After setting the tracking target subject area 45, the tracking control unit 33 obtains color information corresponding to the R, G and B colors in the two-pixel peripheral information areas 41*a*~41*d* set at positions set apart by one pixel from the tracking target subject area 45 on the upper side, the lower side, the left side and the right side and stores the color information thus obtained into the storage unit 38 as subject peripheral information 46*a*~46*d*.

FIG. 4 shows a next image 43*b* obtained in succession to the image 43*a* in time sequence from the second image sensor 19. The tracking control unit 33 extracts an area within the subject search area 47 in the next image 43*b*, assuming a size matching that of the template image 48, as a comparison target area. The tracking control unit calculates differences between color ratios R/G and R/B at each pixel in the comparison target area and the color ratios R/G and R/B at the corresponding pixel in the template image 48 as the comparison target area extraction position is shifted in sequence within the subject search area 47. It then designates a comparison target area with the sum of differences indicating a value equal to or less than a predetermined value as a tracking target subject candidate area 50. FIG. 4(*a*) shows two areas 50*a* and 50*b* designated as tracking target subject candidate areas among the comparison target areas in the next image 43*b*. It is to be noted that reference numeral 50 is used to collectively indicate tracking target subject candidate areas.

Once the tracking target subject candidate areas 50 are determined, image information from the corresponding peripheral information areas 41*aa*, 41*ba*, 41*ca*, 41*da*, 41*ab*, 41*bb*, 41*cb* and 41*db* is obtained and each set of image information from the peripheral information areas is compared with the corresponding subject peripheral information 46. Based upon the comparison results, the tracking target subject candidate area 50 corresponding to the peripheral information area 41 containing information with the highest level of match with the subject peripheral information 46 is designated as the new tracking target subject area 45a. FIG. 4(b) shows the sets of image information obtained from the peripheral information areas 41aa~41da corresponding to the tracking target subject candidate area 50a. The comparison of the subject peripheral information 46a~46d with the individual sets of image information collected from the peripheral information areas 41aa~41da yield a total of three matches, i.e., the information in the peripheral information area 41aa matching the subject peripheral information 46a, the information in the peripheral information area 41ca matching the subject peripheral information 46c and the information in the peripheral information area 41da matching the subject peripheral information 46b, as shown in FIG. 4(c). FIG. 4(d) shows the sets of image information obtained from the peripheral information areas 41ab~41db corresponding to the tracking target subject candidate area 50b. The comparison of the subject peripheral information 46a~46d with the individual sets of image information collected from the peripheral information areas 41ab~41db yield a total of two matches, i.e., the information in the peripheral information area 41ab matching the subject peripheral information 46a and the information in the peripheral information area 41bb matching the subject peripheral information 46b, as shown in FIG. 4(e).

Accordingly, the tracking target subject candidate area 50a, in correspondence to which a greater number of sets of similar peripheral information is obtained, is set as the new tracking target subject area 45a. It is to be noted that if equal numbers of matches are ascertained between the subject peripheral information 46 and the individual sets of information collected from the peripheral information areas 41 set in correspondence to different subject candidate areas 50 or if no match is ascertained in correspondence to either subject candidate area, the comparison target area with the smallest sum of differences relative to the template image 48, determined through the comparison with the template image 48 as described earlier, is designated as the new tracking target subject area 45a.

Once the tracking target subject area 45a is set, the tracking control unit 33 creates a new template image 48 by combining the color information corresponding to the R (red), (green) and B (blue) colors in the template image 48 set in the initial image plane and the color information corresponding to the R (red), G (green) and B (blue) colors in the tracking target subject area 45a. It is to be noted that the color information should be combined with the ratio of the color information from the template image 48 in the initial image plane set higher than that of the color information from the tracking target subject area For instance, the color information may be combined so that the color information in the template image 48 set in the initial image screen accounts for 80% of the combined information and that the color information from the newly set tracking target subject area 45a accounts for 20% of the combined information. After the template image 48 is thus updated, the subject search area 47 is set as shown in FIG. 5(a) in a mariner similar to that described earlier.

The tracking control unit 33 outputs the coordinates of the center of the tracking target subject area 45a to the focus detection calculation unit 35. Based upon the coordinates of the tracking target subject area 45a input thereto, the focus detection calculation unit 35 assumes that the tracking target is present in the focus detection area 40a closest to the center of the tracking target subject area 45a, as shown in FIG. 5(b) and accordingly, calculates the focusing condition based upon the focus detection signals output from the pair of CCD line sensors in the AF sensor module 112 corresponding to the focus detection area 40e. The focus detection calculation unit 35 outputs the selected area signal indicating the focus detection area 40a to the ON/OFF control unit 37 via the tracking control unit 33. In response, the indicator unit 371 turns on the AF area mark for the focus detection area 40a.

It is to be noted that if the plurality of focus detection areas 40 are present equidistant from a center of the tracking target subject area 45a, a focus detection area 40 located along the direction in which the subject is expected to move is selected based upon the direction along which the subject has moved through the images previously obtained in time sequence, i.e., based upon the subject movement history.

Figure 6:
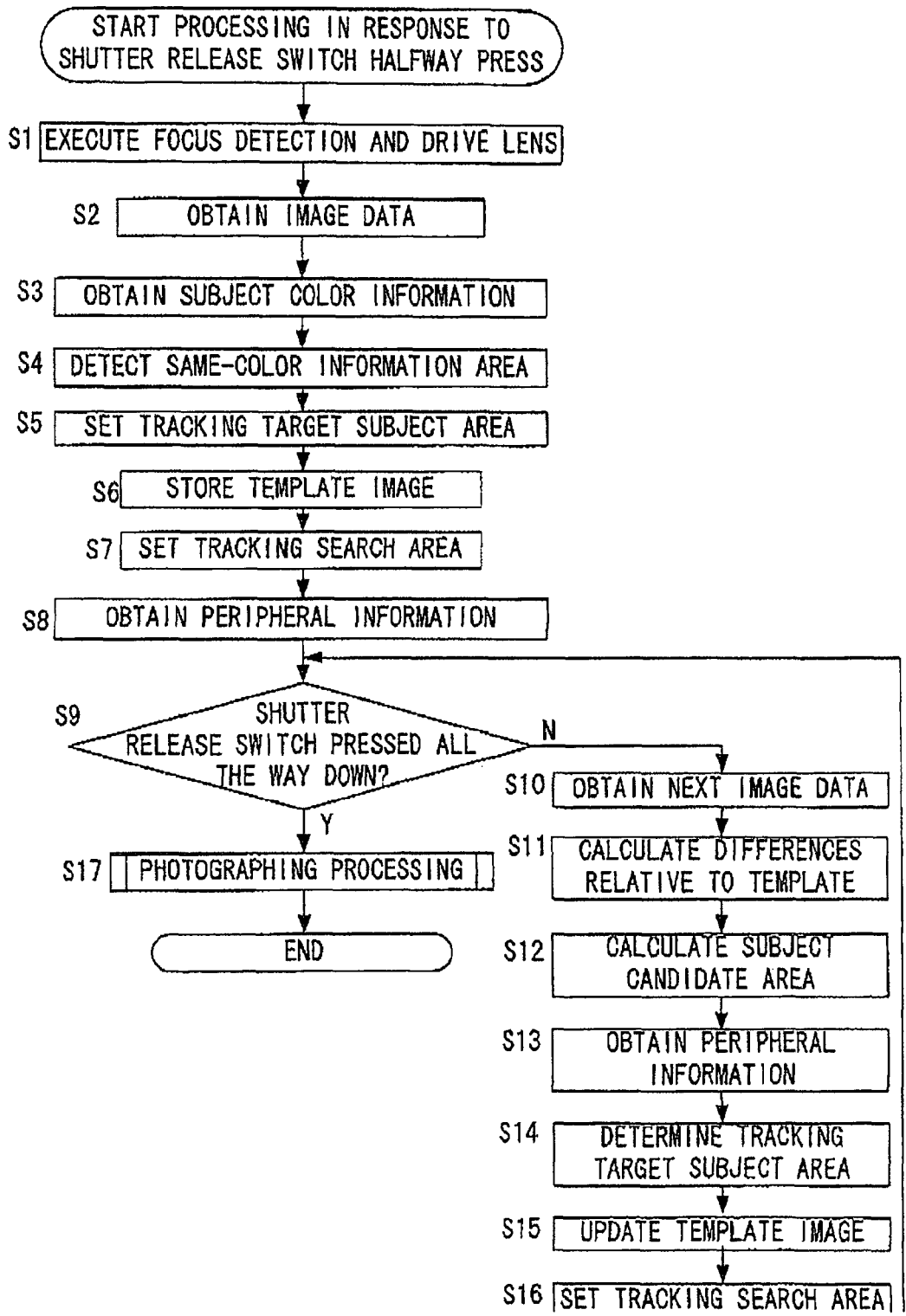

The following is a description of the individual processing phases executed through the subject tracking control operation, given in reference to the flowchart presented in FIG. 6. It is to be noted that the various processing phases in the flowchart are executed by the control unit 30 based upon a program. The processing in the flowchart starts in response to a halfway press operation of the shutter release switch (not shown).

In step S1, the focus is adjusted by driving the photographic lens 21 based upon the results of the focus detection calculation executed by the focus detection calculation unit 35 for the focus detection area 40 set by the photographer. The operation then proceeds to step S2. In step S2, an image is obtained from the second image sensor 19, before the operation proceeds to step S3.

In step S3, the subject color information is obtained based upon the outputs from the pixels corresponding to the selected focus detection area and the subject color information thus obtained is stored into the storage unit 38 before the operation proceeds to step S4. In step S4, the same-color information area 49 holding color information similar to the subject color information obtained in step S3 is detected and then the operation proceeds to step S5. In step S5, a rectangular area enclosing the same-color information area 49 detected in step S4 is set as the tracking target subject area 45, before the operation proceeds to step S6.

In step S6, the tracking target subject area 45 set in step S5 is stored as the template image 48 into the storage unit 38 and the operation proceeds to step S7. In step S7, the subject search area 47 is set as explained earlier based upon the tracking target subject area 45 and then the operation proceeds to step S8. In step S8, the color information corresponding to the R, G and B colors is obtained from the peripheral information areas 41 set around the tracking target subject area 45 and the color information thus obtained is stored as the subject peripheral information 46 into the storage unit 38, before the operation proceeds to step S9.

In step S9, a decision is made as to whether or not the shutter release switch (not shown) has been pressed all the way down by the photographer. If an affirmative decision is made in step S9, i.e., if it is decided in step S9 that the shutter release switch has been pressed all the way down, the operation proceeds to step S17. If, on the other hand, a negative decision is made in step S9, i.e., if it is decided in step S9 that the shutter release switch has not been pressed all the way down, the operation proceeds to step S10.

In step S10, the next image (a new image) is obtained from the second image sensor 19 and then the operation proceeds to step S11. In step S11, an area of the size of the template image 48 is extracted in sequence from the subject search area 47, as explained earlier, and the differences manifested by each area relative to the template image are calculated for the individual pairs of corresponding pixels, before the operation proceeds to step S12. In step S12, any comparison target area with the sum of differences relative to the template image 48 equal to or less than the predetermined value is designated as a tracking target subject candidate area 50 based upon the results of the calculation executed in step S11. The operation then proceeds to step S13.

In step S13, the image information in the peripheral information areas 41 set in correspondence to the tracking target subject candidate area 50 set in step S12 is obtained and is compared with the subject peripheral information 46. The operation then proceeds to step S14. In step S14, a tracking target subject candidate area 50 with the greatest number of sets of image information similar to the subject peripheral information 46 is set as the new tracking target subject area 45, as described earlier, based upon the comparison results obtained in step S13. The operation subsequently proceeds to step S15.

In step S15, the template image 48 is updated through the method described earlier and the updated template image is stored into the storage unit 38. In step S16, a new subject search area 47 is set based upon the new tracking target subject area 45 set in step S14, before the operation returns to step S9. After deciding in step S9 that the shutter release switch has been pressed all the way down, the operation proceeds to step S17 to execute the photographing operation as explained earlier, before the sequence of processing ends.

It is to be noted that the processing in steps S5 and S14, in which the tracking target subject area 45 is set and the processing executed in step S8, in which the subject peripheral information 46 is stored into the storage unit 38 should be regarded as functions of a setting unit that sets image information related to the tracking target image and sets image information constituting image portions assuming positions close to the tracking target image as supplementary image information used to supplement the image information constituting the tracking target image. The processing executed in steps S11 through S14 should be regarded as functions of a recognition unit that identifies the tracking target by using the tracking target image information and the supplementary image information.

The digital camera described in reference to the embodiment above achieves the following advantages.

(1) The tracking target is tracked by setting reference image information obtained from an image range containing the tracking target, i.e., the template image 48, based upon the color information (image information) obtained from the second image sensor 19 and nearby image information, i.e., the subject peripheral information 46, based upon image information constituting image portions near the template image 48. Thus, when the template image 48 is set over a range containing the face of a person being photographed, i.e., a range containing the tracking target, information related to the tracking target, such as information on the clothing worn by the tracking target, can be obtained as the subject peripheral information 46. As a result, another object moving across the tracking target is not erroneously detected as the tracking target, thereby achieving improved tracking reliability.

(2) If a plurality of tracking target subject candidate areas 50 is detected as a result of the difference calculation determining the differences manifested in the image information in various comparison target areas in the subject search area 47 relative to the template image 48, i.e., if there is a plurality of tracking target candidates indicating levels of correlation to the tracking target equal to or greater than a predetermined value, the tracking target subject candidate area 50 with the greatest number of peripheral information areas 41 containing image information similar to the nearby image information, i.e., the subject peripheral information 46, is designated as the new tracking target subject area 45 and the tracking target is tracked accordingly. In other words, even when there is a plurality of photographic subjects with similar image information in the image, the correct tracking subject can be identified based upon the peripheral information and erroneous detection is prevented.

(3) Since the difference calculation is executed to determine the differences between the template image 48 and the extracted areas based upon the color information in the image data (raw data) output from the second image sensor 19, which have not yet undergone image processing, the tracking processing can be executed quickly.

The embodiments described above allows for the following variations.

(1) While the tracking target subject area 45 to be used for reference when setting the template image 48 is determined based upon the color information on the tracking target obtained via the second image sensor 19, the tracking target subject area may instead be selected based upon brightness (luminance) information instead of the color information.

(2) While the image information collected from all four of the peripheral information areas 41 is compared with the image information, a specific peripheral information area 41 that contains, for instance, chromatic image information or characteristic image information alone may be compared with the subject peripheral information, instead of using the image information in all the peripheral information areas. When the tracking target is a person, in particular, the image information related to the clothing or the like worn by the tracking target can be obtained effectively from the peripheral information area 41 located on the lower side of the tracking target subject candidate area 50. In addition, the information in the peripheral information area 41 on the lower side of the tracking target subject candidate area 50 may be weighted with a greater weighting coefficient. Under such circumstances, the attitude of the camera may be detected based upon the output from the attitude sensor 113 installed at the camera body 10 and the peripheral information area 41 on the lower side of the tracking target subject candidate area 50 within the photographic field may be selected by taking into consideration the detected camera attitude.

(3) While the number of sets of subject peripheral information 46 compared with the information in the peripheral information area 41 remains unchanged from the tracking start through the photographing operation end in the example described above, the image information in a specific information peripheral information area 91, which manifests the least extent of change as the tracking control is executed a plurality of times, among the peripheral information areas 41 repeatedly detected through the plurality of tracking control sessions may be set as the subject peripheral information 46.

(4) Instead of comparing the information in the peripheral information areas 41 with the subject peripheral information 46 after selecting a tracking target subject candidate area 50 based upon the template image 48, an integrated template, created by combining the template image 48 and the subject peripheral information 46, may be set.

(5) While the tracking target is tracked by using the color information in the image data (raw data) output from the second image sensor 19, which have not undergone the image processing, in the example described above, the tracking target may be tracked by using color information having undergone image processing such as image peripheral light compensation and white balance adjustment.

(6) A peripheral information area 41 with a defocus quantity differing from the defocus quantity in the tracking target subject area 45 by an extent equal to or less than a predetermined value, among the four peripheral information areas 41, may be selected and the information from the selected peripheral information area 41 may be used as the subject peripheral information 46. In addition, a specific positional relationship to be maintained for the template image 48 and the subject peripheral information 46, may be determined based upon the defocus quantity. In such a case, the distance between the template image 48 and the subject peripheral information 46 should be increased if the distance to the tracking target is smaller, whereas the distance between the template image 48 and the subject peripheral information 46 should be decreased if the distance to the tracking target is greater.

(7) Instead of specifying the tracking target subject through a photographer operation, the tracking processing described above may be started in a camera equipped with a subject recognition function upon setting the tracking target subject based upon the subject recognition results.

(8) While the color information corresponding to the R, G and B colors in the template image 48 and the color information corresponding to the R, G and B colors in the tracking target subject area 45a are combined to create a new template image 48 for an update in the example described above, the initial template image 48 may be continuously used without combining it with the color information from the tracking target subject area 45a.

(9) The range over which the subject peripheral information 46 is extracted may be determined based upon the size of the tracking target subject area 45. For instance, when tracking a person's face as the tracking target subject contained in a tracking target subject area ranging over a 6×6 pixel area, information collected from small areas, e.g., 1 or 2-pixel areas, as the subject peripheral information may only partially represent the color of the clothing (pattern or the like). For this reason, information collected from 2×2 pixel areas with a measurement ratio of 1/3 to the tracking target subject area should be used as the subject peripheral information. In addition, the range of the subject peripheral information extraction areas should be increased in proportion to the size of the tracking target subject area.

(10) The range of the areas from which the subject peripheral information 46 is obtained may be determined based upon lens information indicating the focal length and the like and the image magnification factor (which can be determined based upon the focal length and the photographing range). For instance, the range of the areas over which the subject peripheral information is obtained should be increased when the focal length is smaller or when the image magnification factor is higher. Under these circumstances, it should be ensured that the measurement ratio of the tracking target subject area 45 and the subject peripheral information 46 remains substantially constant. Namely, the range over which the subject peripheral information 46 is obtained may be determined based upon the optical characteristics of the image forming optical system.

(11) The positions at which the subject peripheral information 46 is collected may be adjusted based upon the size of the tracking target subject area 45. For instance, subject peripheral information may be collected at a position further away from the tracking target subject area on the lower side, instead of at a position directly under the tracking target subject area, when the tracking target subject area is larger. Namely, while the subject peripheral information 46 is set apart from the tracking target subject area 45 by a single pixel in the example presented in FIG. 3(c), the subject peripheral information may instead be collected at positions set apart from the tracking target subject area by two or three pixels, since it is more desirable to collect subject peripheral information 46 indicating the color of the clothing worn by the subject whose face is photographed in the tracking target subject area 45 by setting a peripheral area at a position further downward relative to the subject's face instead of at a position directly under the tracking target subject area, from which information indicating the color of the subject's neck will be obtained.

(12) Based upon a principle commonly shared with (9) and (10) above, a greater tracking target subject area 45 may be set as the subject moves closer (as the image magnification factor rises) and, in correspondence, the subject peripheral information 46 may be obtained from larger areas set apart from the tracking target subject area 45 by a greater extent.

(13) When selecting areas holding image information similar to the subject peripheral information 46 in step S14 during the processing described in reference to the embodiment, the subject peripheral information 46 obtained at the position on the lower side relative to the tracking target subject area 45 may be weighted to a greater extent over the other sets of subject peripheral information 46, since the information held in the area below the subject is most likely to be optimal supplementary information when deciding it among peripheral information. For example, as described above, the case is that the tracking target is a person, and the tracking target subject area 45 consists of a face. Through these measures, an area indicating the highest level of match with the peripheral information on the lower side will be set as the new subject area.

(14) While an explanation is given above in reference to an embodiment in which the present invention is adopted in a single-lens reflex digital camera allowing the use of interchangeable photographic lenses, the present invention is not limited to this example and may be adopted in a camera with an integrated lens or a video camera.

The variations described above are summarized in the organized functional block presented in FIG. 7. The processing in the various blocks is executed by the tracking control unit 33. The functions fulfilled through the processing executed by the tracking control unit 33 are divided into those of a setting unit 201 and a recognition unit 202 mentioned earlier. The numbers assigned to the individual blocks correspond to the numbers attached to the variations in the description provided above.

While the invention has been particularly shown and described with respect to preferred embodiments thereof by referring to the attached drawings, the present invention is not limited to this example and it will be understood by those skilled in the art that various changes in form and detail may be made therein without departing from the scope of the invention.

The disclosure of the following priority application is herein incorporated by reference:
Japanese Patent Application No. 2006-233823 filed Aug. 30, 2006

The invention claimed is:

1. An image tracking apparatus, comprising:
  an image capturing unit that generates first image information corresponding to an image at a first time by capturing an image formed through an image forming optical system and second image information corresponding to an image at a second time after the first time;
  a setting unit that sets (1) first tracking image information that includes image information corresponding to a part of an image to be designated as a tracking target, among the first image information, (2) second tracking image information based upon information of an image positioned close to the image corresponding to the first tracking image information, among the first image information, (3) third tracking image information that includes image information corresponding to a part of an image to be designated as a tracking target, among the second image information, and (4) fourth tracking image information based upon information of an image positioned close to the image corresponding to the third tracking image information, among the second image information; and a recognition unit that recognizes the tracking target using the second tracking image information and the fourth tracking image information.

2. An image tracking apparatus according to claim 1, wherein:

the setting unit (1) sets the second tracking image information so that a size of the image corresponding to the second tracking image information ranges over a smaller area than the image corresponding to the first tracking image information, and (2) sets the fourth tracking image information so that a size of the image corresponding to the fourth tracking image information becomes smaller than the image corresponding to the third tracking image information.

3. An image tracking apparatus according to claim 1, wherein:

the setting unit repeatedly detects information related to an image assuming a position close to the image corresponding to the first tracking image information and designates image information indicating a least extent of change as the second tracking image information.

4. An image tracking apparatus according to claim 1, wherein:

if a plurality of sets of the third tracking image information indicating levels of correlation to the first tracking image information equal to or greater than a predetermined value are detected as candidates that may be recognized as the tracking target, the recognition unit selects one of a plurality of the candidates based upon (1) the second tracking image information and (2) the fourth tracking image information of each piece of sets of the plurality of the third tracking image information.

5. An image tracking apparatus according to claim 4, wherein:

the recognition unit selects one of the candidates by weighting the second tracking image information set on a lower side of the image corresponding to the first tracking image information in the image information to a greater extent than the second tracking image information set elsewhere.

6. An image tracking apparatus according to claim 1, wherein:

the setting unit determines at least one of a size or a position of the image corresponding to the second tracking image information based upon a size of the image corresponding to the first reference tracking image information.

7. An image tracking apparatus according to claim 1, wherein:

the setting unit determines a size of the image corresponding to the second tracking image information based upon optical characteristics of the image forming optical system.

8. An image tracking apparatus according to claim 1, wherein:

the image information is color information or luminance information.

9. A camera, comprising:

an image tracking apparatus according to claim 1.

10. A camera according to claim 9, further comprising:

an attitude detection device that detects an attitude of the camera, wherein:

the recognition unit includes a determination unit that determines the second tracking image information based upon an output from the attitude detection device.

11. A camera according to claim 9, wherein:

the image information has undergone image processing.

12. An image tracking apparatus according to claim 1, further comprising:

a focus detection device that detects a focusing condition of the image forming optical system in relation to the tracking target, wherein the setting unit determines the second tracking image information based upon the focusing condition.

13. An image tracking apparatus according to claim 1, wherein the setting unit sets a plurality of the third tracking image information based upon the second image information, and a plurality of the fourth tracking image information based upon the plurality of third tracking image information, and among the plurality of fourth tracking image information, the recognition unit determines the fourth tracking image information in which correlation with the second tracking image information is the highest and recognizes the tracking target, using the determined fourth tracking image information.

14. An image tracking apparatus according to claim 13, wherein among the plurality of the third tracking image information, the recognition unit recognizes the tracking target, using the third tracking image information corresponding to the determined fourth tracking image information.

15. An image tracking method, comprising:

generating first image information corresponding to an image at a first time by capturing an image formed through an image forming optical system, and second image information corresponding to an image at a second time after the first time;

setting (1) first tracking image information which includes image information corresponding to a part of an image to be designated as a tracking target in the first image information and (2) second tracking image information based upon a position of an image close to the image corresponding to the first tracking image information, among the first image information;

setting (1) third tracking image information that includes image information corresponding to a part of an image to be designated as the tracking target, among the second image information and (2) fourth tracking image information based upon information of an image positioned close to the image corresponding to the third tracking image information, among the second image information; and recognizing the tracking target based upon the second tracking image information and the fourth tracking image information.

16. An image tracking method according to claim 15, wherein:

information related to an image assuming a position close to the image corresponding to the first tracking image information is repeatedly detected and image information indicating a least extent of change is designated as the second tracking image information.

17. An image tracking method according to claim 15, wherein:
when a plurality of sets of image information indicating levels of correlation to the first tracking image information equal to or greater than a predetermined value are detected as candidates that may be recognized as the tracking target, one of a plurality of the candidates is selected based upon the second tracking image information.

18. An image tracking method according to claim 17, wherein:
one of the candidates is selected by weighting the second tracking image information set on a lower side of the image corresponding to the first tracking image information in the image information to a greater extent than the second tracking image information set elsewhere.

19. An image tracking method according to claim 15, wherein:
at least one of a size or a position of the image corresponding to the second tracking image information is determined based upon a size of the image corresponding to the first tracking image information.

20. An image tracking method according to claim 15, wherein:
a size of the image corresponding to the second tracking image information is determined based upon optical characteristics of the image forming optical system.

21. An image tracking method according to claim 15, wherein
the second tracking image information is determined based upon the focusing condition of the image forming optical system with respect to the tracking target.

22. An image tracking apparatus, comprising:
an image capturing unit that generates image information by capturing an image formed through an image forming optical system;
a setting unit that (1) sets, based upon the image information, first tracking image information that includes image information corresponding to a part of an image to be designated as a tracking target, among the image information, and (2) sets second tracking image information based upon information of an image positioned close to an image corresponding to the first tracking image information;
a recognition unit that recognizes the tracking target in a following image by (1) setting a comparison target area, in the following image captured by the image capturing unit, that compares with the first tracking image information, (2) setting a vicinity information area that is positioned close to the comparison target area and compares with the second tracking image information, (3) comparing the first tracking image information with image information of the comparison target area, and (4) comparing the second tracking image information with image information of the vicinity information area; and
a focus detection device that detects a focusing condition of the image forming optical system in relation to the target, wherein
the setting unit determines the second tracking image information based upon the focusing condition.

23. The image tracking apparatus according to claim 22, wherein:
the setting unit (1) sets a plurality of areas positioned close to the image corresponding to the first tracking image information and (2) sets, as the second tracking image information, image information of the area having a defocus amount in which the difference with the defocus amount of the image corresponding to the first tracking image information is a predetermined value or less.

24. The image tracking apparatus according to claim 22, wherein:
if a plurality of image information indicating correlation, of a predetermined value or more, to the first reference image information are detected as candidates to be recognized as the tracking target, the recognition unit selects one of a plurality of the candidates by comparing the second reference image information with image information of the vicinity information area.

\* \* \* \* \*